(12) United States Patent
Gates

(10) Patent No.: US 9,369,077 B1
(45) Date of Patent: Jun. 14, 2016

(54) DIFFERENTIAL SPEED CONTROL APPARATUS

(71) Applicant: Daniel M. Gates, Charlotte, NC (US)

(72) Inventor: Daniel M. Gates, Charlotte, NC (US)

( * ) Notice: Subject to any disclaimer, the term of this patent is extended or adjusted under 35 U.S.C. 154(b) by 142 days.

(21) Appl. No.: 14/215,736

(22) Filed: Mar. 17, 2014

Related U.S. Application Data

(60) Provisional application No. 61/790,740, filed on Mar. 15, 2013.

(51) Int. Cl.
*H02P 9/06* (2006.01)
(52) U.S. Cl.
CPC ........................................ *H02P 9/06* (2013.01)
(58) Field of Classification Search
CPC .... H02P 9/06; H02P 2101/30; H02P 29/0016
USPC .......................................................... 322/40
See application file for complete search history.

(56) References Cited

U.S. PATENT DOCUMENTS

| | | | | |
|---|---|---|---|---|
| 4,439,720 A * | 3/1984 | Georges | ............................ | 322/4 |
| 5,901,269 A * | 5/1999 | Chang | ............................ | 388/832 |
| 6,527,660 B1* | 3/2003 | Sugden | ............................ | 475/77 |
| 6,573,626 B1* | 6/2003 | Gosebruch et al. | ............. | 310/74 |
| 2001/0041640 A1* | 11/2001 | Sakai et al. | .................... | 475/207 |
| 2004/0098988 A1* | 5/2004 | Goi | ................................ | 60/772 |
| 2009/0023545 A1* | 1/2009 | Beaudoin | ........................ | 476/42 |
| 2013/0106367 A1* | 5/2013 | Beaudoin et al. | ............... | 322/40 |

\* cited by examiner

*Primary Examiner* — Joseph Waks
*Assistant Examiner* — Sean Gugger
(74) *Attorney, Agent, or Firm* — Robert C. Montgomery; Montgomery Patent & Design, LLC

(57) ABSTRACT

A differential speed control apparatus is provided having an input shaft in connection with a transmission, a speed reducer, and a planetary gear unit acting in concert to generate a constant rotational output, which is transferred to an electrical generator. The apparatus controls and converts a varying input speed to a constant output speed through a feedback system to automatically adjust the transmission based upon rotational speed of the output shaft. This feedback system enables continuous adjustment of the transmission to produce a constant output where the input is variable.

7 Claims, 1 Drawing Sheet

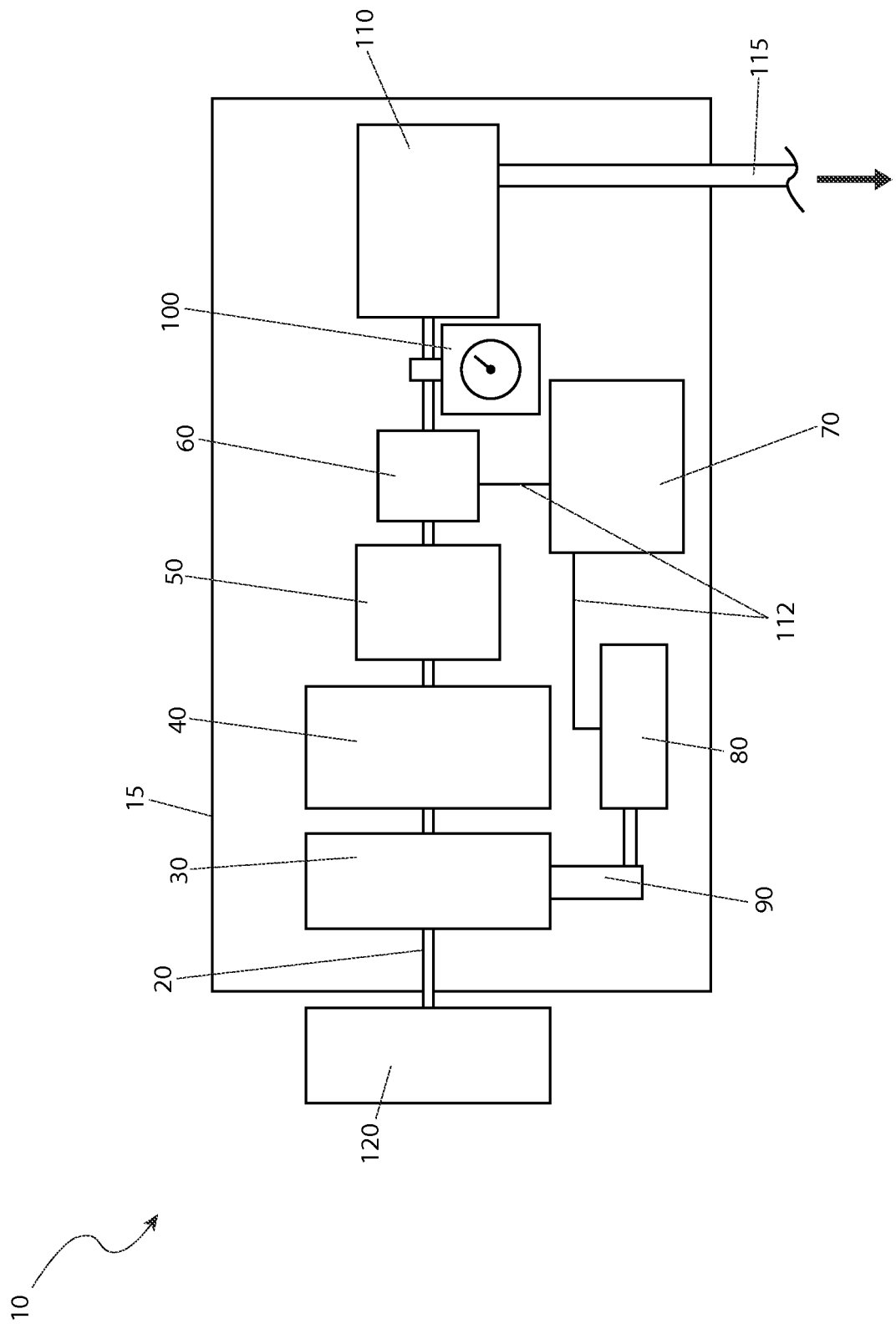

DIFFERENTIAL SPEED CONTROL APPARATUS

RELATED APPLICATIONS

The present invention was first described in and claims the benefit of U.S. Provisional Application No. 61/790,740, filed 15 Mar. 2013, the entire disclosures of which are incorporated herein by reference.

FIELD OF THE INVENTION

The present invention relates to a differential speed control that employs a feedback system in connection with an output shaft and a transmission to generate a constant output from a varying input.

BACKGROUND OF THE INVENTION

From the beginning of time, mankind has relied on various sources of energy to survive. These sources have included wood, coal, oil, wind-power, water-power, and nuclear energy to just name a few. As each form of energy was discovered, mankind continued on in the quest for the next, better form of energy. Some of these energy sources, such as wind-power and water-power, produce energy that is at different levels depending on the naturally occurring phenomenon. An example of this is a wind turbine, which obviously turns faster when the wind is blowing harder. However, this variable speed input results in a generator that turns at variable speed as well, thus producing voltage, current, and/or frequency levels that vary. This output power is then difficult or even impossible to use when powering conventional electrical items, as power spikes and sags result in equipment damage or failure. Accordingly, there exists a need for a means by which a constant rotational force can be provided to electrical generators regardless of the constant performance from a prime mover. The development of the apparatus fulfills this need.

The apparatus of the present invention controls and converts a varying input speed to a constant output speed through an electronic controller. It allows for driving an electrical generator at a constant speed to produce a stable output voltage. The input shaft of the apparatus is in connection with a transmission, a speed reducer, and a planetary gear unit acting in concert to generate a constant rotational output, which is transferred to the electrical generator. An encoder and speed control module are employed to create a feedback system to automatically adjust the transmission based upon rotational speed of the output shaft. This feedback system enables continuous adjustment of the transmission to produce a constant output where the input is variable.

Prior art in this field consist of power generator systems having engine throttles, transmission ratio controls, multiple shafts, and complex gearing systems. These prior art devices lack the utility of simplicity, effectiveness, and efficiency afforded by the present invention. Other prior art attempt to manipulate the input energy before being converted into work energy. It is, therefore, an objective of the present invention to provide a means to maintain a constant rotational output of a transmission being subjected to varying rotational inputs. It is a further objective of the present invention to continuously monitor and control the rotational output via a feedback system comprising the output shaft and planetary gearing of the transmission, regardless of the input. It is a further objective of the present invention to provide a differential speed control system that is simple, effective, and efficient.

SUMMARY OF THE INVENTION

The apparatus controls a speed, in revolutions per minute (RPM), of an electrical generator so that varying inputs to the generator can be used to produce a constant, stable output. An input shaft of the apparatus is used to transfer varying rotational energies from a rotary power source. The input shaft is in connection with a transmission, a speed reducer, and a planetary gear unit acting in concert to generate a constant rotational output, which is transferred to an electrical generator. A variator rod is provided with the apparatus to either increase or decrease an output shaft portion of the transmission, preferably by adjusting an angle of an internal swash plate portion of the transmission, thus increasing or decreasing the rotational speed of the electrical generator to which the output shaft is in connection with.

The shaft is equipped with a rotary encoder to communicate rotational speed to a speed control module, which is in communication with a positioning motor. The positioning motor manipulates the variator rod based upon inputs from the speed control module. The speed control module, the positioning motor, and the variator rod act in concert to provide a closed-loop control of the generator's speed.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 1 is a block diagram of a differential speed control apparatus 10, according to a preferred embodiment of the present invention.

DESCRIPTIVE KEY 10 differential speed control apparatus
15 platform
20 input shaft
30 transmission
40 reducer
50 planetary gear unit
60 encoder
70 speed control module
80 positioning motor
90 variator rod
100 tachometer
110 generator
112 wiring
115 output power
120 input power source

DETAILED DESCRIPTION OF THE PREFERRED EMBODIMENT

The best mode for carrying out the invention is presented in terms of its preferred embodiment, herein depicted within FIG. 1. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a differential speed control apparatus (herein described as the "apparatus") 10, which provides a means for controlling a speed, in RPM's, of an electrical generator 110 to produce output power 115 having a stable voltage.

Referring now to FIG. 1, a block diagram view of the apparatus 10, according to the preferred embodiment of the present invention, is disclosed. The apparatus 10 includes an input shaft 20 which may be rotated via mechanical connection to various rotary power means such as a windmill, a water wheel, or the like. It is envisioned for the apparatus 10 to be sized and geared appropriately to enable a generator 110 to produce constant output power 115. This output power 115 can then be utilized to supply electrical current to various items such as those used in a common household, an electric vehicle, or other similar device. It is also envisioned for the apparatus 10 to run continuously, based upon availability of the input power source 120.

An embodiment of the apparatus 10 is illustrated here providing a transmission 30, a speed reducer 40, and a planetary gear unit 50. The portions of the apparatus 10 are envisioned to be securely mounted to a base plate or platform 15 and designed to obtain a particular rotary speed (RPM) being required by the generator 110 in order to produce a particular voltage. The transmission 30 is preferably a hydrostatic unit which provides an externally adjustable speed variator rod 90. The speed reducer 40 supplies the apparatus 10 with the necessary torque, and the planetary gear unit 50 supplies the apparatus 10 with needed speed. It is understood that the actual configurations and types of the speed reducer 40 and planetary gear unit 50 would be based upon space constraints and other mechanical factors, and as such should not be interpreted as a limiting factor of the apparatus 10.

The apparatus 10 also comprises a rotary encoder 60, which is envisioned to be a rotary shaft encoder 60, and is installed upon a shaft portion between the planetary gear unit 50 and the generator 110, where a tachometer is also placed 100. Data from the encoder 60 is communicated to a speed control module 70 via wiring 112, which in turn controls and powers a positioning motor 80 being mechanically connected to a variator rod portion 90 of the transmission 30. The encoder 60 is envisioned to acquisition the revolutions per minute of the shaft portion and convert this to an analog signal, the frequency of which matches that of the revolutions per minute. This analog signal is transmitted, via the wiring, to the speed control module 70 to be processed and compared with a pre-set periodic cycle that is the preferred cycle for the generator 110. The variator rod 90 acts to increase or decrease an output shaft portion of the transmission 30 and subsequently the rotational speed of the generator 110. The variator rod 90 is envisioned to adjust an angle of an internal swash plate portion within the transmission 30 in a conventional manner. It is also envisioned that the positioning motor 80 be of a high torque type being capable of smooth clockwise and counterclockwise rotation, thereby providing bi-directional motioning of the variator rod 90. Once the generator 110 reaches the set speed as determined by the speed control module 70, the transmission 30 will maintain the constant output, thereby producing electricity having a consistent voltage.

The speed control module 70 receives data from the encoder 60 and causes the positioning motor 80 to adjust the variator rod 90, thereby providing closed-loop control of the speed of the generator 110.

It is envisioned that the gear-reduction function of the planetary gear unit 50 could be varied, or additional planetary gear units 50 could be added as required to increase and decrease the rotation speed of the generator 110 by a higher factor.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be configured as indicated in FIG. 1.

The method of installing and utilizing the apparatus 10 may be achieved by performing the following steps: acquiring the apparatus 10; utilizing the transmission 30 and a generator 110 being securely mounted to a base plate or platform 15; establishing mechanical communication between the output of the transmission 30 and the generator 110 via speed reducer 40 and a planetary gear unit 50 portions; enabling the encoder 60 to monitor the speed and provide a corresponding signal to the speed control module 70 via wiring 112; allowing the controller module to energize the positioning motor 80 to act upon the variator rod 90 causing the transmission 30 to speed up or down to maintain a constant output speed; enabling the generator 110 to rotate at a consistent speed (RPM) and produce electrical power having a consistent voltage; and, using the output power 115 produced by for use in powering various electrical devices as desired.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A differential speed control apparatus, comprising:
   an ancillary input power source;
   a rotational and torque transmission mechanism, comprising:
      an input shaft portion adapted to mechanically engage with said ancillary input power source;
      a speed reducer mechanically engaged with said input shaft portion;
      a planetary gear unit mechanically engaged with said speed reducer;
      a swash plate mechanically engaged with said planetary gear unit; and,
      an output shaft portion mechanically engaged with said planetary gear unit and adapted to mechanically engage with an ancillary generator;

a feedback system, comprising:
- an encoder in electro-mechanical communication with said output shaft portion to generate rotational speed data;
- a speed control module in electrical communication with said encoder;
- a positioning motor in electro-mechanical communication with said speed control module; and,
- a variator rod in mechanical engagement with said positioning motor and said swash plate;

wherein said speed control module is pre-set to compare said rotational speed data with a pre-determined periodic cycle of said ancillary generator and manipulates said variator rod via said positioning motor by causing said positioning motor to rotate said variator rod and actuate said swash plate to maintain a constant rotational speed of said output shaft portion.

2. The differential speed control apparatus recited in claim 1, wherein said rotational speed data is revolutions per minute converted into an analog signal and processed to determine if a frequency of said analog signal matches that of said pre-determined periodic cycle.

3. The apparatus recited in claim 1, further comprising a platform upon which said rotational and torque transmission mechanism is affixed.

4. The apparatus recited in claim 1, wherein said rotational and torque transmission mechanism is a hydrostatic transmission.

5. The apparatus recited in claim 1, wherein said encoder is a rotary shaft encoder.

6. The apparatus recited in claim 1, wherein said positioning motor is a motor capable of forward and reverse rotation.

7. The apparatus recited in claim 1, further comprising a tachometer in communication with said output shaft portion.

\* \* \* \* \*